United States Patent [19]
Watanabe et al.

[11] Patent Number: 5,394,308
[45] Date of Patent: Feb. 28, 1995

[54] LIGHTING APPARATUS HAVING ASYMMETRIC LIGHT INTENSITY DISTRIBUTION OF COMPENSATING FOR LOW CONTRAST RATIOS OF LCD PANEL

[75] Inventors: Takahiko Watanabe; Osamu Sukegawa, both of Tokyo, Japan

[73] Assignee: NEC Corporation, Tokyo, Japan

[21] Appl. No.: 205,100

[22] Filed: Mar. 3, 1994

[30] Foreign Application Priority Data

Mar. 3, 1993 [JP] Japan .................................. 5-041641

[51] Int. Cl.$^6$ ............................................. F21V 33/00
[52] U.S. Cl. ....................................... 362/31; 359/42; 359/48
[58] Field of Search ......................... 362/31, 26, 327; 359/42, 48, 49, 50

[56] References Cited

U.S. PATENT DOCUMENTS

| | | | |
|---|---|---|---|
| 4,860,171 | 8/1989 | Kojima | 362/31 |
| 4,937,709 | 6/1990 | Yanagi et al. | 362/31 |
| 5,134,549 | 7/1992 | Yokoyama | 362/31 |
| 5,178,447 | 1/1993 | Murase | 362/31 |

FOREIGN PATENT DOCUMENTS 3-5726  11/1991  Japan .

*Primary Examiner*—Richard R. Cole
*Attorney, Agent, or Firm*—Sughrue, Mion, Zinn, Macpeak & Seas

[57] ABSTRACT

A lighting apparatus for illuminating a liquid crystal display (LCD) panel from behind is disclosed, wherein the LCD panel, when illuminated uniformly, exhibits asymmetric contrast ratios as viewed in a vertical direction. The apparatus comprises a light guide panel having a multitude of light reflecting dots on a reflecting surface opposite to the LCD panel, and a light source for injecting light into the light guide panel in a horizontal direction through a first edge of the light guide panel, so that the light propagates through the light guide panel toward the opposite edge of the panel and irregularly reflects off the dots toward the liquid crystal display panel. The light reflecting dots in a lower portion of the reflecting surface have a lower density than those in an upper portion of the reflecting surface, and each of these portions of the reflecting surface has a density increasing as a function of distance from the first edge of the light guide panel so that the LCD panel has equal brightness at the upper and lower portions when viewed at an angle substantially equal to 90° and an angle smaller than 90°, respectively.

4 Claims, 2 Drawing Sheets

LIGHTING APPARATUS HAVING ASYMMETRIC LIGHT INTENSITY DISTRIBUTION OF COMPENSATING FOR LOW CONTRAST RATIOS OF LCD PANEL

BACKGROUND OF THE INVENTION

1. Field of the Invention

The present invention relates generally to liquid crystal display panels, and more specifically to a lighting apparatus used for illuminating an LCD panel from behind.

2. Description of the Related Art

Lighting apparatus for backwardly illuminating LCD panels are known in the art as shown and described in Japanese Patent Publication (Kokai) 91-5726. The lighting apparatus consists of a light guide panel and a light source for injecting light horizontally into the light guide from one edge of the panel. The lower surface of the light guide is formed with such a pattern of dots that it irregularly reflects the light. The density of the dots is varied with distance from the entry edge of the light guide so that the LCD panel is illuminated uniformly. However, the LCD panel, when illuminated uniformly, exhibits inherent asymmetric contrast ratios (between white dots and black dots) as the vertical viewing angle varies as shown in FIG. 1A, although the contrast ratios with respect to the horizontal viewing angle are substantially symmetrical as shown in FIG. 1B. As a result, when the LCD panel is viewed by an operator from a normal working position, the lower portion of the panel has an unsatisfactory low brightness and contrast in comparison with those of the upper portion of the panel.

SUMMARY OF THE INVENTION

It is therefore an object of the present invention to provide a lighting apparatus for illuminating a liquid crystal display panel having asymmetric vertical contrast ratios with light of asymmetric intensity for improving the brightness and contrast of the lower portion of the LCD panel.

According to a first aspect of the present invention, there is provided a lighting apparatus for illuminating a liquid crystal display panel from behind, wherein the liquid crystal display panel, when illuminated uniformly, exhibits asymmetric contrast ratios as viewed in a vertical direction. The apparatus comprises a light guide panel having a multitude of light reflecting dots arranged on a reflecting surface of the light guide panel opposite to the liquid crystal display panel, and a light source for injecting light into the light guide panel in a horizontal direction through a first edge of the light guide panel, so that the light propagates through the light guide panel toward a second, opposite edge of the panel and irregularly reflects off the dots toward the liquid crystal display panel. The light reflecting dots in a lower portion of the reflecting surface have a density decreasing as a function of distance from an upper portion of the reflecting surface, and the light reflecting dots in each of the lower and upper portions have a density increasing as a function of distance from the first edge of the light guide panel so that the LCD panel has equal brightness at the upper and lower portions of the panel when these upper and lower portions are viewed respectively at an angle substantially equal to 90° and an angle smaller than 90°.

According to a second aspect, the lighting apparatus of this invention comprises a light guide panel having a multitude of light reflecting dots arranged on a reflecting surface of the light guide panel opposite to the liquid crystal display panel, a first light source for injecting light into the light guide panel in a vertical direction through an upper edge of the light guide panel, so that the light propagates through the light guide panel toward a lower edge of the panel and irregularly reflects off the dots toward the liquid crystal display panel, and a second light source for injecting light into the light guide panel in the vertical direction through the lower edge of the light guide panel, so that the light propagates through the light guide panel toward the upper edge and irregularly reflects off the dots toward the liquid crystal display panel. The light reflecting dots in a lower portion of the reflecting surface have a lower density than the light reflecting dots in an upper portion of the reflecting surface, and the light reflecting dots in each of the lower and upper portions has an equal density in the horizontal direction so that the LCD panel has equal brightness at the upper and lower portions of the panel when these upper and lower portions are viewed respectively at an angle substantially equal to 90° and an angle smaller than 90°.

BRIEF DESCRIPTION OF THE DRAWINGS

The present invention will be described in further detail with reference to the accompanying drawings, in which.

DETAILED DESCRIPTION

Figure 1A:
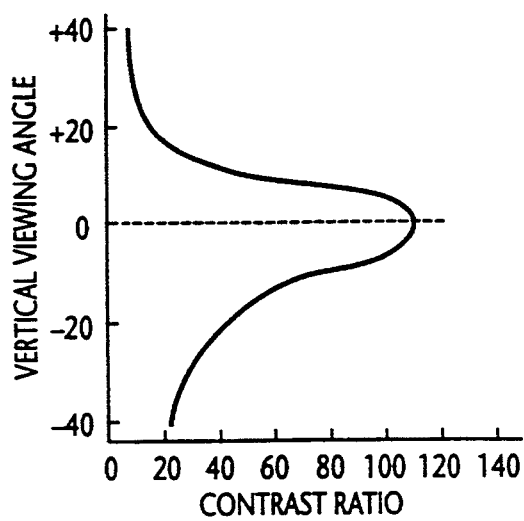
FIGS. 1A and 1B are graphic representations of contrast ratios of a conventional liquid crystal display (LCD) panel as a function of vertical and horizontal viewing angles, respectively.
Figure 1B:
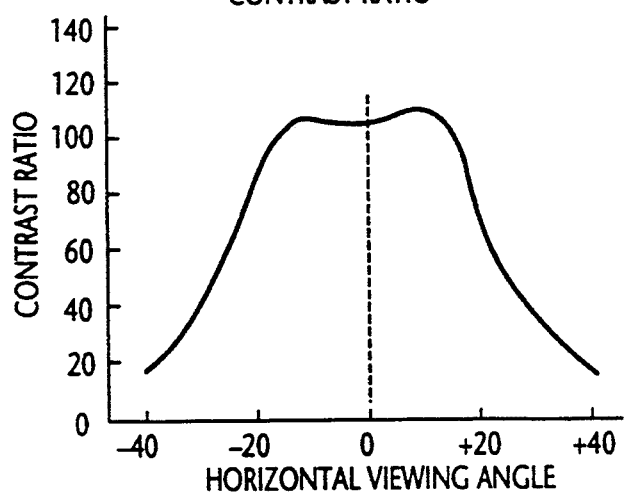
Figure 2:
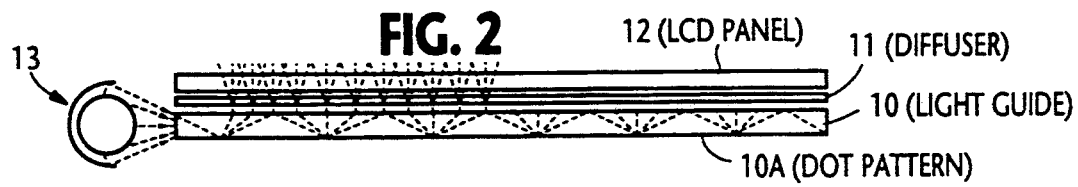
FIG. 2 is a side view of a lighting apparatus of the present invention with a liquid crystal display panel shown mounted above the lighting apparatus.

Referring now to FIG. 2, the lighting apparatus according to one embodiment of the present invention comprises a light guide panel 10, typically 4 millimeters thick and a diffuser panel 11 mounted above the light guide panel 10. The light guide 10 is composed of glass or acrylic resin and is formed with a pattern 10A of light reflecting dots on its lower surface. The dot pattern 10A is produced by sputtering or evaporating such reflective material as silver or aluminum. A light source 13 is provided for injecting light from one edge of the light guide panel 10, where the light rays propagate along zigzag paths toward the opposite edge of the panel, repeatedly bouncing off the dot pattern 10A, and emerges the upper surface of the light guide panel 10. On leaving the light guide panel 10, the reflected light rays are uniformly dispersed by the diffuser panel 11 and illuminate an LCD panel 12, typically 2.5 millimeters thick, which is mounted above the diffuser panel 11.

Figure 3:
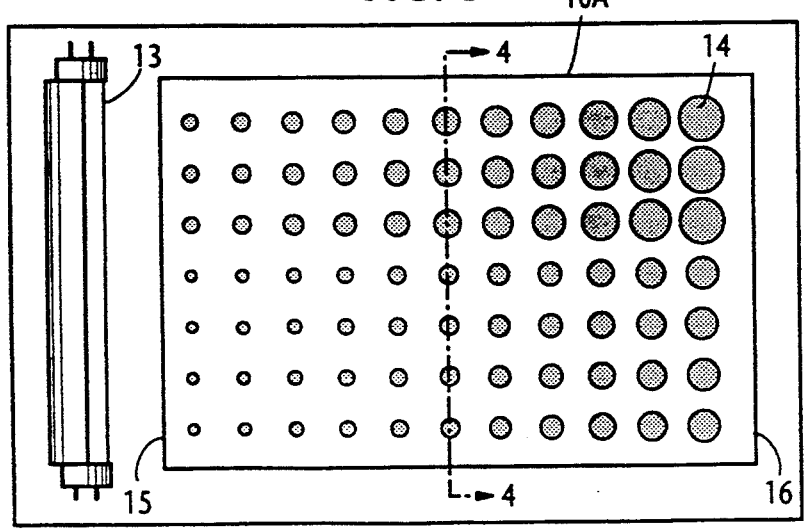
FIG. 3 is a bottom view of the light guide panel of FIG. 2 according to one embodiment of the present invention.
Figure 4:
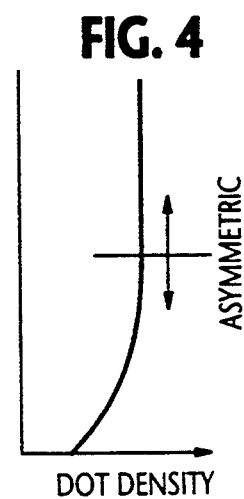
FIG. 4 is a view showing an asymmetric dot density pattern taken along the lines 4—4 of FIG. 3.

As shown in FIG. 3, the dot pattern 10A comprises a matrix array of dots 14 of different sizes. Along each row of the matrix, the size of each dot 14 increases as a function of distance from the light entry edge 15 of light guide panel 10 to the opposite edge 16. Along each column of the matrix, on the other hand, the dot size is equal in the upper half of the column and equal in the lower half. However, the dot size of the upper half of each column is greater than the dot size of the lower half of the column. In this way, the density of the dots 14 is asymmetrical along each column of the matrix with respect to the mid row of the matrix as shown in FIG. 4. The size of the dots is in the range between 1 and 3000 micrometers, preferably in the range between 10 and 1000 micrometers. The density of the lower portion of dot pattern is therefore lower than the density of the upper portion.

Since the dot density increases along the rows of the matrix from the light entry edge 15 and the light decreases in intensity as it propagates through the light guide panel 10, the amount of light rays reflecting off the dots of each row is equal to each other.

Figure 5:
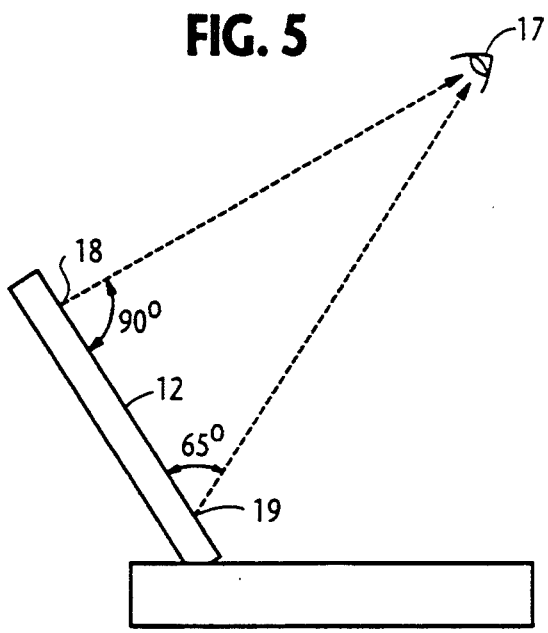
FIG. 5 is a side view of the LCD panel illuminated by the lighting apparatus of the present invention as viewed from an operator in a working position at different angles to the upper and lower edges of the panel.

When the LCD panel 12 is illuminated with the lighting apparatus of the present invention and viewed from a position 17 as shown in FIG. 5, the viewing position 17 is at an angle substantially equal to 90 degrees to the upper edge 18 of the panel and at an angle, typically 65 degrees, to the lower edge 19 of the panel. Because of the reduced light intensity in the lower portion of the lighting apparatus, the brightness at the upper portion of the LCD panel is equal to the brightness at the lower portion at the viewing position 17. The contrast ratios of the LCD panel in the upper and lower portion are therefore made substantially equal to each other.

Figure 6:
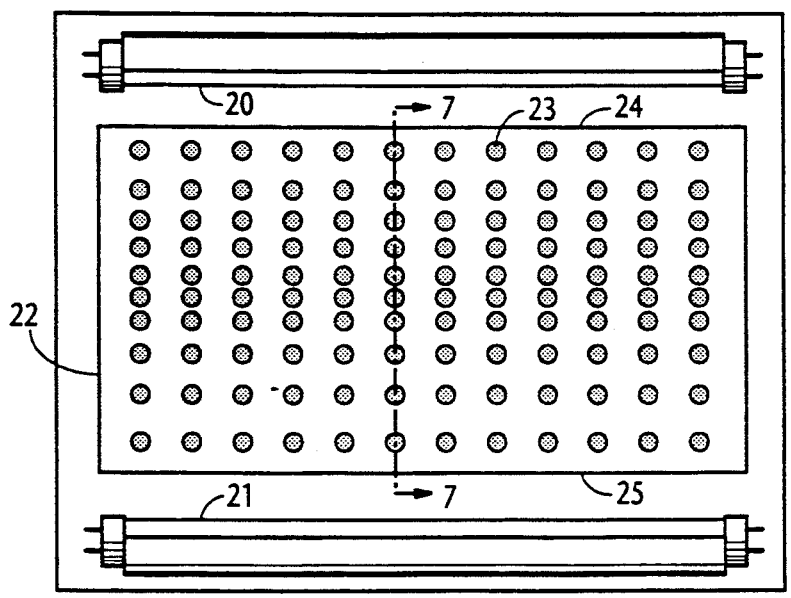
FIG. 6 is a bottom view of a light guide panel of a modified embodiment of the present invention.
Figure 7:
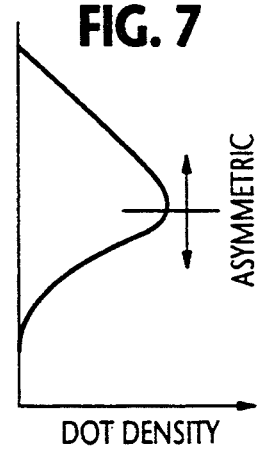
FIG. 7 is a view showing an asymmetric dot density pattern taken along the lines 7—7 of FIG. 6.

A second embodiment of the present invention is shown in FIG. 6 in which two light sources 20 and 21 are provided respectively adjacent to the upper and lower edges 24 and 25 of a light guide panel 22 for injecting light rays inwardly in opposite directions. On the lower surface of the panel 22 is formed a matrix array of dots 23 of equal size. The density of the dots 23 is uniform along each row of the matrix, but increases as a function of distance from the upper edge 24 of the panel 22 to the mid row of the matrix and then decreases as a function of distance from the mid row to the lower edge 25. Note that the dot density in the lower half of the matrix is lower than the density of the upper half as shown in FIG. 7. Similar to the previous embodiment, the contrast ratio of the lower portion of LCD panel 12 is improved.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A lighting apparatus for illuminating a liquid crystal display panel from behind, wherein said liquid crystal display panel, when illuminated uniformly, exhibits asymmetric contrast ratios as viewed in a vertical direction, comprising:

a light guide panel having a first surface adjacent said liquid crystal display panel, a second surface being opposite to the first surface and remote from said liquid crystal display panel, and a multitude of light reflecting dots arranged on said second surface; and a light source for injecting light into said light guide panel in a horizontal direction through a first edge of the light guide panel, so that the light propagates through said light guide panel toward a second, opposite edge of the panel and irregularly reflects off said dots toward said liquid crystal display panel through the first surface of the light guide panel, wherein the light reflecting dots in a lower portion of the second surface of the light guide panel have a density decreasing as a function of distance from an upper portion of the second surface, and the light reflecting dots in each of said lower and upper portions have a density increasing as a function of distance from said first edge of the light guide panel to said second edge thereof so that said liquid crystal display panel has equal brightness at upper and lower portions thereof when the upper and lower portions of the liquid crystal display panel are viewed respectively at an angle substantially equal to 90° and an angle smaller than 90°.

2. A lighting apparatus as claimed in claim 1, wherein a portion of said light reflecting dots adjacent said second edge of the light guide panel has a larger size in comparison with a portion of said light reflecting dots adjacent said first edge of the light guide panel.

3. A lighting apparatus for illuminating a liquid crystal display panel from behind, wherein said liquid crystal display panel, when illuminated uniformly, exhibits asymmetric contrast ratios as viewed in a vertical direction, comprising:

a light guide panel having a first surface adjacent said liquid crystal display, a second surface being opposite to the first surface and remote from said liquid crystal display, and a multitude of light reflecting dots arranged on said second surface;

a first light source for injecting light into said light guide panel in a vertical direction through an upper edge of the light guide panel, so that the light propagates through said light guide panel toward a lower edge of the panel and irregularly reflects off said dots toward said liquid crystal display panel through said first surface of the light guide panel; and a second light source for injecting light into said light guide panel in said vertical direction through said lower edge of the light guide panel, so that the light propagates through said light guide panel toward said upper edge and irregularly reflects off said dots toward said liquid crystal display panel through said first surface of the light guide panel, wherein the light reflecting dots located in a lower portion of said reflecting surface have a lower density than the light reflecting dots arranged in an upper portion of the reflecting surface, and the light reflecting dots in each of said lower and upper portions have an equal density in said horizontal direction so that said liquid crystal display panel has equal brightness at upper and lower portions thereof when the upper and lower portions of the liquid crystal display panel are viewed respectively at an angle substantially equal to 90° and an angle smaller than 90°.

4. A lighting apparatus as claimed in claim 3, wherein said light reflecting dots have equal dot size.

* * * * *